US012355952B2

(12) United States Patent
Oh et al.

(10) Patent No.: US 12,355,952 B2
(45) Date of Patent: Jul. 8, 2025

(54) METHOD OF DECODING MOTION VECTOR

(71) Applicant: GENSQUARE LLC, Seoul (KR)

(72) Inventors: Soo Mi Oh, Seongnam (KR); Moonock Yang, Singapore (SG)

(73) Assignee: GENSQUARE LLC, Seoul (KR)

( * ) Notice: Subject to any disclaimer, the term of this patent is extended or adjusted under 35 U.S.C. 154(b) by 0 days.

(21) Appl. No.: 18/528,459

(22) Filed: Dec. 4, 2023

(65) Prior Publication Data
US 2024/0155116 A1 May 9, 2024

Related U.S. Application Data

(63) Continuation of application No. 17/584,096, filed on Jan. 25, 2022, now Pat. No. 11,889,065, which is a (Continued)

(30) Foreign Application Priority Data

Nov. 7, 2011 (KR) .................. 10-2011-0115218

(51) Int. Cl.
H04N 19/109 (2014.01)
H04N 19/105 (2014.01)
(Continued)

(52) U.S. Cl.
CPC ......... H04N 19/109 (2014.11); H04N 19/105 (2014.11); H04N 19/124 (2014.11);
(Continued)

(58) Field of Classification Search
None
See application file for complete search history.

(56) References Cited

U.S. PATENT DOCUMENTS

2005/0232358 A1 10/2005 Nicolas
2007/0092002 A1 4/2007 Xue et al.
(Continued)

FOREIGN PATENT DOCUMENTS

CN 1885948 A 12/2006
CN 101860754 A 10/2010
(Continued)

OTHER PUBLICATIONS

Kondo et al., "Improvement of Delta-QP Coding," Joint Collaborative Team on Video Coding (JCT-VC) of ITU-T SG16 WP3 and ISO/IEC JTC1/SC29/VG11, 6th Meeting, Torino, IT, Jul. 14-22, 2011 (downloaded on Jul. 1, 2011), JCTVC-F422, pp. 1-6.

(Continued)

Primary Examiner — Talha M Nawaz
(74) Attorney, Agent, or Firm — Birch, Stewart, Kolasch & Birch, LLP

(57) ABSTRACT

A method of decoding an image can include constructing an amvp candidate list using available motion vector candidates of a left, an above and a temporal motion vector candidate, selecting a motion vector predictor among motion vector candidates of the amvp candidates list using the amvp index, and generating a motion vector using the motion vector predictor and a differential motion vector. The method further includes generating a prediction block using the motion vector and a reference picture index, inversely quantizing a quantized block using a quantization parameter to generate a transformed block and inversely transforming the transformed block to generate a residual block, and generating a reconstructed block. Also, the quantization parameter is generated per quantization unit, a minimum size of the quantization unit is adjusted per picture, and the quantization parameter is generated using a differential (Continued)

quantization parameter and a quantization parameter predictor.

6 Claims, 10 Drawing Sheets

Related U.S. Application Data continuation of application No. 16/990,553, filed on Aug. 11, 2020, now Pat. No. 11,259,017, which is a continuation of application No. 16/046,623, filed on Jul. 26, 2018, now Pat. No. 10,757,405, which is a continuation of application No. 15/256,291, filed on Sep. 2, 2016, now Pat. No. 10,057,572, which is a continuation of application No. 14/354,529, filed as application No. PCT/CN2012/084182 on Nov. 7, 2012, now Pat. No. 9,451,249.

(51) Int. Cl.
   *H04N 19/124* (2014.01)
   *H04N 19/126* (2014.01)
   *H04N 19/129* (2014.01)
   *H04N 19/159* (2014.01)
   *H04N 19/176* (2014.01)
   *H04N 19/46* (2014.01)
   *H04N 19/463* (2014.01)
   *H04N 19/52* (2014.01)

(52) U.S. Cl.
   CPC ......... *H04N 19/126* (2014.11); *H04N 19/129* (2014.11); *H04N 19/159* (2014.11); *H04N 19/176* (2014.11); *H04N 19/46* (2014.11); *H04N 19/463* (2014.11); *H04N 19/52* (2014.11)

(56) References Cited

U.S. PATENT DOCUMENTS

| | | | |
|---|---|---|---|
| 2009/0169124 A1 | 7/2009 | Wallace et al. | |
| 2009/0213930 A1 | 8/2009 | Ye et al. | |
| 2009/0296808 A1 | 12/2009 | Regunathan et al. | |
| 2010/0086051 A1 | 4/2010 | Park et al. | |
| 2012/0099646 A1 | 4/2012 | Coban et al. | |
| 2012/0320969 A1 | 12/2012 | Zheng et al. | |
| 2014/0085415 A1* | 3/2014 | Bici ..................... | H04N 19/597 348/43 |

FOREIGN PATENT DOCUMENTS

| | | |
|---|---|---|
| JP | 2008-211697 A | 9/2008 |
| JP | 2011-514056 A | 4/2011 |
| WO | WO 2011/062392 A2 | 5/2011 |
| WO | WO 2011/115659 A1 | 9/2011 |
| WO | WO 2011/156458 A1 | 12/2011 |

OTHER PUBLICATIONS

Aoki et al., "CE4 Subtest 2: Spatial QP Prediction: Combination of Test 2.3.g, 2.3.f and 2.3.e," Joint Collaborative Team on Video Coding (JCT-VC) of ITU-T SG16 WP3 and ISO/IEC JTC1/SC29/WG11, 6th Meeting, Torino, IT, Jul. 14-22, 2011 (Date Saved Jul. 7, 2011), JCTVC-F661, pp. 1-10.

Aoki et al., "Prediction-Based QP Derivation," Joint Collaborative Team on Video Coding (JCT-VC) of ITU-T SG16 WP3 and ISO/IEC JTC1/SC29/WG11, 5th Meeting, Geneva, CH, Mar. 16-23, 2011 (downloaded on Mar. 11, 2011), JCTVC-E215, pp. 1-11.

Bross et al., "WD4: Working Draft 4 of High-Efficiency Video Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, JCTVC-F803_d6, pp. 1-216 (228 pages).

International Search Report for PCT/CN2012/084182 mailed on Feb. 28, 2013.

Sato et al., "Description of Core Experiment 4: Quantization," Joint Collaborative Team on Video Coding (JCT-VC) of ITU-T SG16 WP3 and ISO/IEC JTC1/SC29/WG11, Document: JCTVC-E704r1, 5th Meeting, Geneva, CH, Mar. 16-23, 2011, pp. 1-9.

Sole et al., "CE11: Unified Scans for the Significance Map and Coefficient Level Coding in High Efficiency," Joint Collaborative Team on Video Coding (JCT-VC) of ITU-T SG16 WP3 and ISO/IEC JTC1/SC29/WVG11, 6th Meeting, Torino, IT, Jul. 14-22, 2011, JCTVC-F288, pp. 1-9.

Sole et al., "Unified Scans for the Significance Map and Coefficient Level Coding in High Coding Efficiency," Joint Collaborative Team on Video Coding (JCT-VC) of ITU-T SG16 WP3 and ISO/IEC JTC1/SC29/WG11, 5th Meeting, Geneva, CH, Mar. 16-23, 2011, JCTVC-E335, pp. 1-4.

Wiegand et al., "Overview of the H.264/AVC Video Coding Standard," IEEE Transactions on Circuits and Systems for Video Technology, vol. 13, No. 7, Jul. 2003, 17 pages.

Zhou et al., "CE9: Simplified AMVP Design (SP061 SI, SP06S2)," Joint Collaborative Team on Video Coding (JCT-VC) of ITU-T SG16 WP3 and ISO/IEC JTC1/SC29/WVG11, 6th Meeting, Torino, IT, Jul. 14-22, 2011 (downloaded on Jul. 1, 2011), JCTVC-F088, pp. 1-16.

* cited by examiner

METHOD OF DECODING MOTION VECTOR

CROSS-REFERENCE TO RELATED APPLICATIONS

This application is a Continuation application of U.S. application Ser. No. 17/584,096 filed on Jan. 25, 2022 (now U.S. Pat. No. 11,889,065, issued on Jan. 30, 2024), which is a Continuation application of U.S. application Ser. No. 16/990,553 filed on Aug. 11, 2020 (now U.S. Pat. No. 11,259,017, issued on Feb. 22, 2022), which is a Continuation application of U.S. application Ser. No. 16/046,623 filed on Jul. 26, 2018 (now U.S. Pat. No. 10,757,405, issued on Aug. 25, 2020), which is a Continuation application of U.S. application Ser. No. 15/256,291 filed on Sep. 2, 2016 (now U.S. Pat. No. 10,057,572, issued on Aug. 21, 2018), which is a Continuation application of U.S. application Ser. No. 14/354,529 filed on Apr. 25, 2014 (now U.S. Pat. No. 9,451,249, issued on Sep. 20, 2016), which was filed as the National Phase of PCT International Application No. PCT/CN2012/084182 filed on Nov. 7, 2012, which claims priority benefit to Korean Patent Application No. 10-2011-0115218 filed in the Republic of Korea on Nov. 7, 2011, where all of these applications are hereby expressly incorporated by reference into the present application.

BACKGROUND OF THE INVENTION

Field of the Invention

The present invention relates to a method of deriving motion vector, and more particularly, to a method of deriving motion vector by generating motion vector candidates.

Discussion of the Background Art

In H.264/MPEG-4 AVC, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and a quantization matrix. The quantized coefficient of the quantized block is scanned by a predetermined scan pattern and then entropy-coded. The quantization parameter is adjusted per macroblock and encoded using a previous quantization parameter.

In H.264/MPEG-4 AVC, motion estimation is used to eliminate temporal redundancy between consecutive pictures. To detect the temporal redundancy, one or more reference pictures are used to estimate motion of a current block, and motion compensation is performed to generate a prediction block using motion information. The motion information includes one or more reference picture indexes and one or more motion vectors.

According to the H.264/MPEG-4 AVC, only the motion vectors are predicted and encoded using neighboring motion vectors, and the reference picture indexes are encoded without neighboring reference picture indexes.

However, if various sizes are used for inter prediction, the correlation between motion information of a current block and motion information of one or more neighboring block increases. Also, the correlation between motion vector of a current block and motion vector of neighboring block within a reference picture becomes higher as the picture size becomes larger if motion of image is almost constant or slow. Accordingly, the conventional compression method described above decreases compression efficiency of motion information if the picture size is larger than that of high-definition picture and various sizes are allowed for motion estimation and motion compensation.

SUMMARY OF THE INVENTION

The present invention is directed to a method of motion vector using multiple motion vector candidates.

One aspect of the present invention provides a method of deriving a motion vector of a current prediction unit, comprising: extracting a differential motion vector and an advanced motion vector prediction (AMVP) index from a bit stream; constructing an AMVP candidate list using two available motion vector candidates if at least two of a left motion vector candidate, an above motion vector candidate and a temporal motion vector candidate are available; selecting a motion vector predictor among the AMVP candidate list using the AMVP index; and generating a motion vector using the motion vector predictor and the differential motion vector. The temporal motion vector candidate is a motion vector of a temporal motion vector candidate block within a temporal motion vector candidate picture. The temporal motion vector candidate block is determined based on a position of the temporal motion vector candidate block.

A method according to an embodiment of the present invention extracts a differential motion vector and an AMVP index from a bit stream, constructs an AMVP candidate list using two available motion vector candidates if at least two of a left motion vector candidate, an above motion vector candidate and a temporal motion vector candidate are available, selects a motion vector predictor among the AMVP candidate list using an AMVP index, and generates a motion vector using the motion vector predictor and the differential motion vector. The temporal motion vector candidate is a motion vector of a temporal motion vector candidate block within a temporal motion vector candidate picture. The temporal motion vector candidate block is determined based on a position of the temporal motion vector candidate block. Accordingly, the coding efficiency of the motion information is improved by including various motion vector candidates. Also, the computational complexity of an encoder and a decoder is reduced maintaining improvement of coding efficiency by adaptively storing motion information of reference picture and adaptively generating a temporal motion vector candidate.

Further, an embodiment of the present invention provides an apparatus of encoding an image in an advanced motion vector prediction (AMVP) mode, the apparatus comprising: an inter prediction module for determining motion information of a current block, and generating a prediction block of the current block using the motion information; a transform module for transforming the residual block to generate a transformed block; a quantization module for quantizing the transformed block using a quantization parameter and a quantization matrix to generate a quantized block; a scanning module for scanning quantized coefficient components of the quantized block; and an entropy coding module for entropy-coding the scanned quantized coefficient components of the quantized block, in which the motion information is encoded by performing the sub-steps of: constructing an AMVP list using available motion vector candidates of a left motion vector candidate, an above motion vector candidate and a temporal motion vector candidate; selecting a motion vector predictor among motion vector candidates of the AMVP candidate list; generating a differential motion vector by subtracting the motion vector predictor from the motion vector; and encoding a reference picture index, the differential motion vector and an AMVP index specifying the motion vector predictor, in which the quantization parameter is determined per a quantization unit, a differential quantization parameter generated using a quantization parameter predictor is converted into bins for indicating the absolute value and a bin for indicting a sign, and bins for indicating the absolute value and a bin for indicting a sign are encoded, in which the quantization parameter predictor is generated by averaging two quantization parameters of a left quantization parameter, an above quantization parameter and a previous quantization parameter if two or more quantization parameters are available, and an average of the above and previous quantization parameters is set as the quantization parameter predictor when the left quantization parameter is unavailable.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

An image encoding apparatus and an image decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 1:
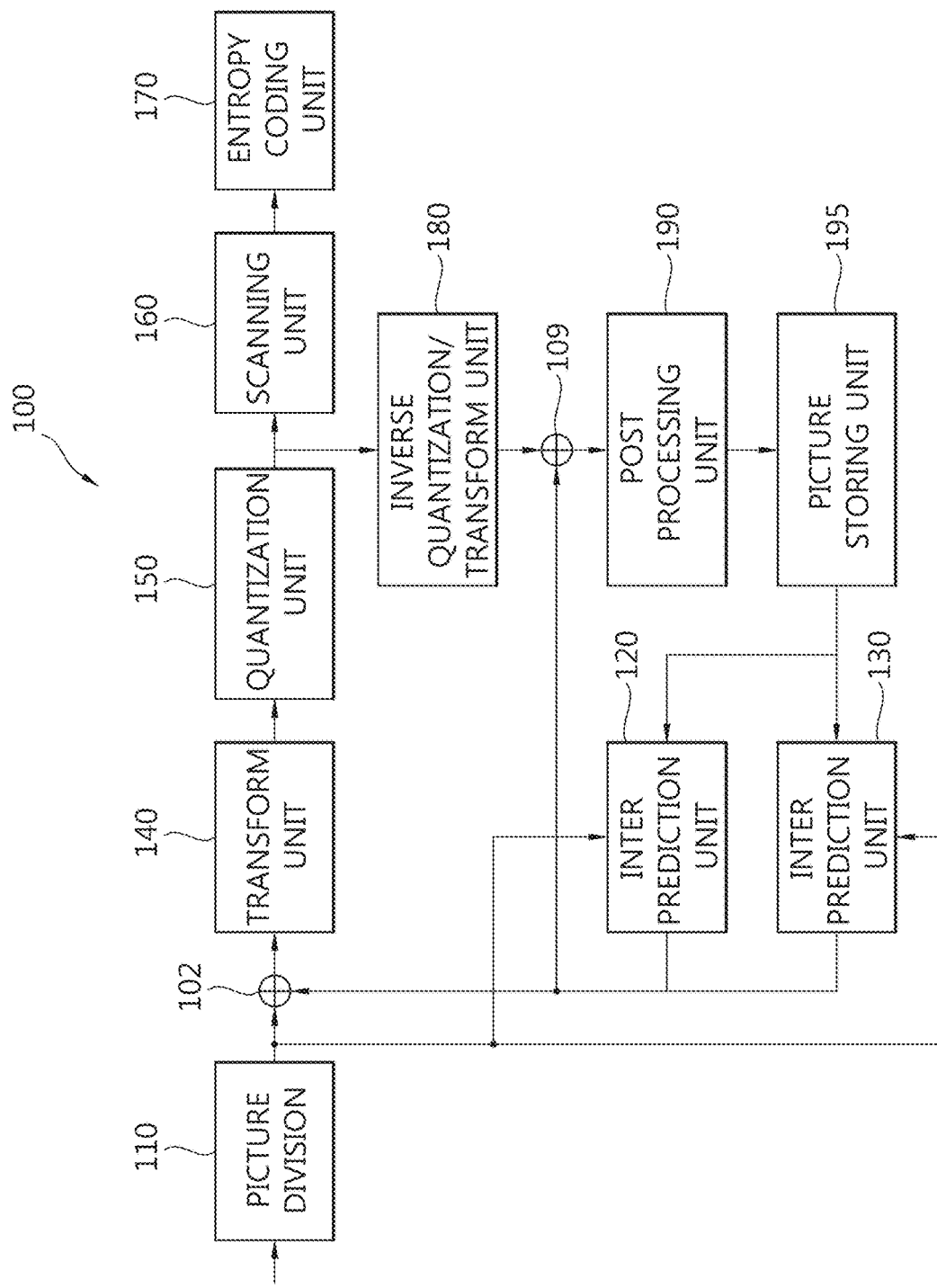
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 110, an intra prediction unit 120, an inter prediction unit 130, a transform unit 140, a quantization unit 150, a scanning unit 160, an entropy coding unit 170, an inverse quantization unit 155, an inverse transform unit 145, a post-processing unit 180, a picture storing unit 190, a subtracter 192 and an adder 194.

The picture division unit 110 divides a picture or a slice into largest coding units (LCUs), and divides each LCU into one or more coding units. The size of LCU may be 32×32, 64×64 or 128×128. The picture division unit 110 determines prediction mode of each coding unit and a size of prediction unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags (split cu flags). The size of a coding unit is 2N×2N. If the size of the LCU is 64×64 and the size of a smallest coding unit (SCU) is 8×8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by a partitioning mode. The partitioning mode is 2N×2N, 2N×N, N×2N or N×N if the coding unit is partitioned symmetrically. The partitioning mode is hN×2N, (2−h)N×2N, 2N×hN and 2N×(2−h)N if the coding unit is partitioned asymmetrically. The value of h is ½. If the size of the coding unit is smaller than 16×16, the asymmetric partitioning modes are not allowed.

A coding unit includes one or more transform units. The transform unit has a recursive quad tree structure to specify a division structure of the coding unit. The division structure is specified by one or more split transform unit flags (split transform flags). Parameters for specifying the maximum size and the minimum size of the transform unit are included in a sequence parameter set. The chroma transform unit has half the height and half the width of the transform unit if the transform unit is not 4×4. The minimum size of the chroma transform unit is 4×4.

The intra prediction unit 120 determines an intra prediction mode of a current prediction unit and generates a prediction block using the intra prediction mode.

The inter prediction unit 130 determines motion information of the current prediction unit using one or more reference pictures stored in the picture storing unit 190, and generates a prediction block of the prediction unit. The motion information includes one or more reference picture indexes and one or more motion vectors.

The transform unit 140 transforms residual signals generated using a current block and a prediction block to generate a transformed block. The residual signals are transformed by the transform unit. A transform matrix is determined by the prediction mode and the size of the transform unit. The transform matrix is a DCT-based integer transform matrix or a DST-based integer transform matrix. Inter prediction, the DCT-based integer transform matrix is used.

The quantization unit 150 determines a quantization parameter for quantizing the transformed block. The quantization parameter is a quantization step size. The quantization parameter is determined per quantization unit. The size of the quantization unit may vary and be one of allowable sizes of coding unit. If a size of the coding unit is equal to or larger than a minimum size of the quantization unit, the coding unit becomes the quantization unit. A plurality of coding units may be included in a minimum quantization unit. The minimum size of the quantization unit is determined per picture and a parameter for specifying the minimum size of the quantization unit is included in a picture parameter set.

The quantization unit 150 generates a quantization parameter predictor and generates a differential quantization parameter by subtracting the quantization parameter predictor from the quantization parameter. The differential quantization parameter is entropy-coded.

The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameters are available, an average of the left and above quantization parameters is set as the quantization parameter predictor. If only one of the left and above quantization parameters is available, an average of the available quantization parameter and the previous quantization parameters is set as the quantization parameter predictor. If both of the left and above quantization parameters are unavailable, the previous quantization parameter is set as the quantization parameter predictor. The average is rounded off.

The differential quantization parameter is converted into bins for the absolute value of the differential quantization parameter and a bin for indicating sign of the differential quantization parameter through a binarization process, and the bins are arithmetically coded. If the absolute value of the differential quantization parameter is 0, the bin for indicating sign may be omitted. Truncated unary is used for binarization of the absolute.

The quantization unit 150 quantizes the transformed block using a quantization matrix and the quantization parameter to generate a quantized block. The quantized block is provided to the inverse quantization/transform unit 180 and the scanning unit 160.

The scanning unit 160 determines applies a scan pattern to the quantized block.

In inter prediction, a diagonal scan is used as the scan pattern if CABAC is used for entropy coding. The quantized coefficients of the quantized block are split into coefficient components. The coefficient components are significant coefficients, coefficient flags and coefficient levels. The diagonal scan is applied to each of the coefficient components. The significant flag indicates whether the corresponding quantized coefficient is zero or not. The coefficient sign indicates a sign of non-zero quantized coefficient, and the coefficients level indicates an absolute value of non-zero quantized coefficient.

When the size of the transform unit is larger than a predetermined size, the quantized block is divided into multiple subsets and the diagonal scan is applied to each subset. Significant flags, coefficient signs and coefficients levels of each subset are scanned respectively according to the diagonal scan. The predetermined size is 4×4. The subset is a 4×4 block containing 16 transform coefficients.

The scan pattern for scanning the subsets is the same as the scan pattern for scanning the coefficient components. The significant flags, the coefficient signs and the coefficients levels of each subset are scanned in the reverse direction. The subsets are also scanned in the reverse direction.

A parameter indicating last non-zero coefficient position is encoded and transmitted to the decoder. The parameter specifies a position of last non-zero quantized transform coefficient within the transform unit. A non-zero subset flag may be set for each subset other than the first subset and the last subset. The first subset covers a DC coefficient. The last subset covers the last non-zero coefficient. The non-zero subset flag indicates whether the subset contains non-zero coefficients or not.

The inverse quantization/transform unit 180 inversely quantizes the quantized coefficients of the quantized block, and inversely transforms the inverse-quantized block to generate residual block.

The post-processing unit 190 performs a deblocking filtering process for removing blocking artifact generated in a reconstructed picture.

The picture storing unit 195 receives post-processed image from the post-processing unit 190, and stores the image in picture units. A picture may be a frame or a field.

The entropy coding unit 170 entropy-codes the scanned coefficient component received from the scanning unit 160, intra prediction information received from the intra prediction unit 120, motion information received from the inter prediction unit 130, and so on.

Figure 2:
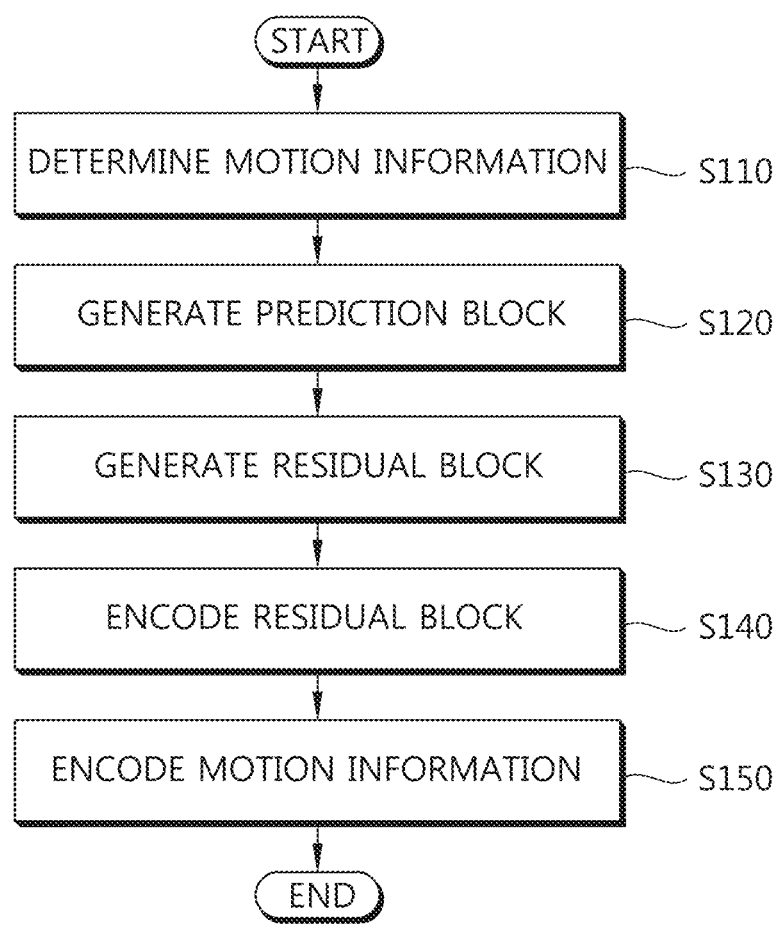
FIG. 2 is a flow chart illustrating a method of encoding video data in inter prediction mode according to the present invention.

FIG. 2 is a flow chart illustrating a method of encoding video data in inter prediction mode according to the present invention.

Motion information of a current block is determined (S110). The current block is a prediction unit. A size of the current block is determined by a size of a coding unit and a partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes a reference index specifying a picture of a reference list 0, a reference index specifying a picture of a reference list 1, and a list 0 motion vector and a list 1 motion vector.

A prediction block of the current block is generated using the motion information (S120). If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated using the current block and the prediction block (S130).

The residual block is encoded (S140). The residual block has the same size of the transform unit. If the prediction unit is larger than the transform unit, the residual signals between the current block and the prediction block are divided into multiple residual blocks. The one or more residual blocks are encoded by the transform unit 140, the quantization unit 150, the scanning unit 160 and the entropy coding unit 170 of FIG. 1.

The motion information is encoded (S150). The motion information may be encoded predictively using spatial candidates and a temporal candidate of the current block. The motion information is encoded in a skip mode, a merge mode or an AMVP mode. In the skip mode, the prediction unit has the size of coding unit and the motion information is encoded using the same method as that of the merge mode.

Figure 3:
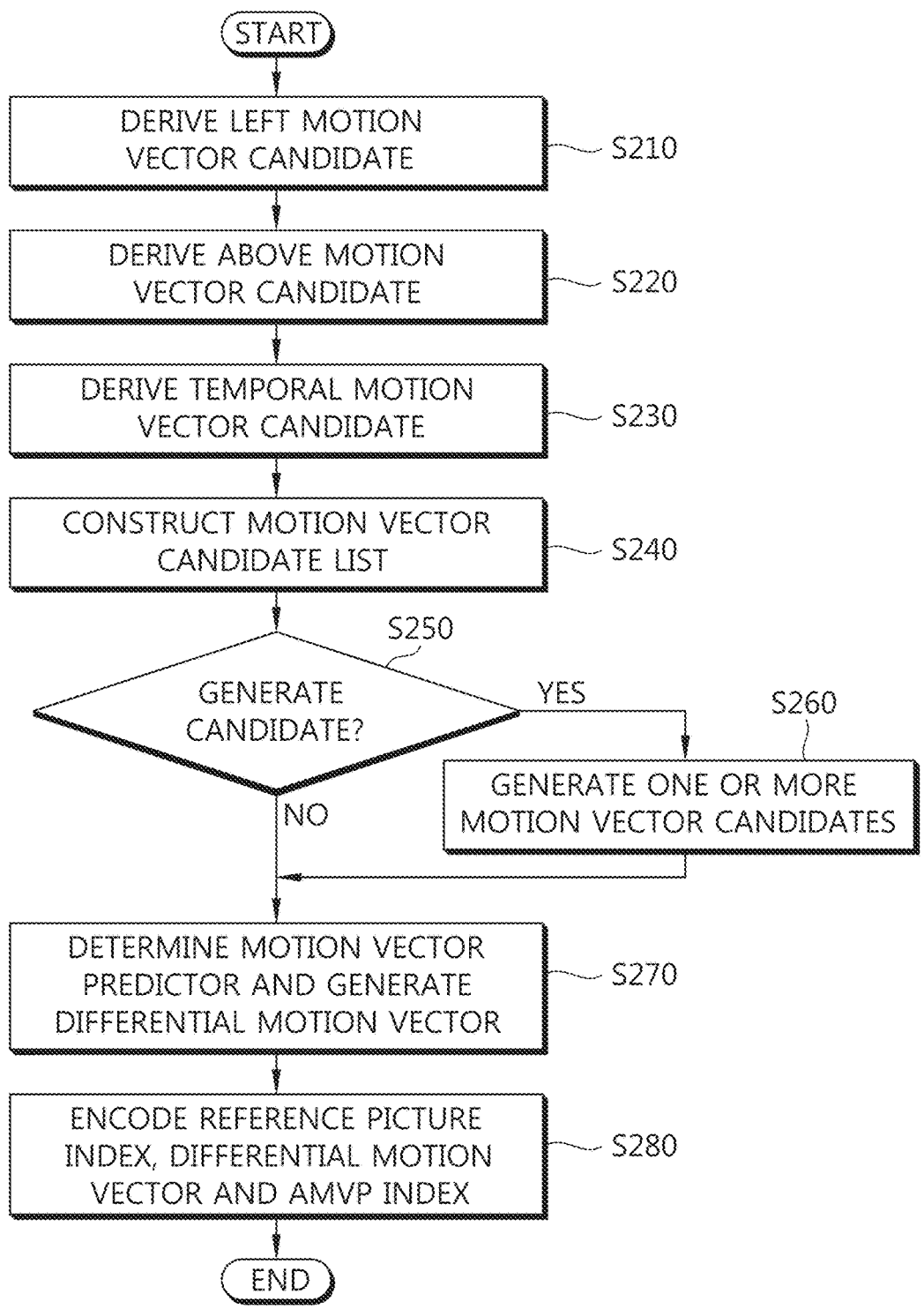
FIG. 3 is a flow chart illustrating a method of encoding motion information in an AMVP mode according to the present invention.
Figure 4:
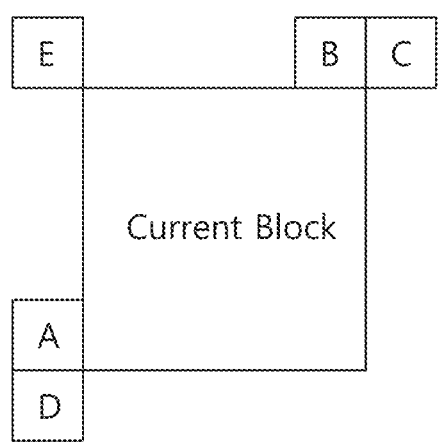
FIG. 4 is a conceptual diagram illustrating positions of spatial motion vector candidate blocks according to the present invention.

FIG. 3 is a flow chart illustrating a method of encoding motion information in the AMVP mode according to the present invention. FIG. 4 is a conceptual diagram illustrating positions of spatial motion vector candidate blocks according to the present invention.

A left motion vector candidate is a motion vector of a left block (block A) or a left-below block (block D) of a current block. An above motion vector candidate is a motion vector of an above block (block B), an above-right block (block C) or an above-left block (block E) of the current block. The neighboring block belongs to one of four types with respect to the current block. If the neighboring block has same reference picture and same reference picture list with the current block, the neighboring block belongs to the first type. If the neighboring block has same reference picture and different reference picture list with the current block, the neighboring block belongs to the second type. If the neighboring block has different reference picture and same reference picture list with the current block, the neighboring block belongs to the third type. If the neighboring block has different reference picture and different reference picture list with the current block, the neighboring block belongs to the fourth type.

The left motion vector candidate is derived (S210). It is determined whether the block D belongs to the first type or the second type. If the block D belongs to the first type or the second type, the motion vector of the bock D is set as the left motion vector candidate. If the block D does not belong to the first type or the second type, it is determined whether the block A belongs to the first type or the second type. If the block A belongs to the first type or the second type, the motion vector of the bock A is set as the left motion vector candidate. If the block A does not belong to the first type or the second type, it is determined whether the block D belongs to the third type or the fourth type. If the block D belongs to the third type or the fourth type, the scaled motion vector of the bock D is set as the left motion vector candidate. If the block D does not belong to the third type or the fourth type, it is determined whether the block A belongs to the third type or the fourth type. If the block A belongs to the third type or the fourth type, the scaled motion vector of the bock A is set as the left motion vector candidate. If the block A does not belong to the third type or the fourth type, the left motion vector candidate is set as unavailable.

The above motion vector candidate is derived (S220). The above motion vector candidate is determined depending on the left motion vector candidate. If any one of the blocks C, B and E belongs to the first type or the second type, the motion vector of the first block encountered when the blocks C, B and E are retrieved in this order is set as the above motion vector candidate. But, if any one of the blocks C, B and E does not belong to the first type or the second type, the above motion vector is determined as follows.

If the left motion vector candidate belongs to the first type or the second type, the motion vector of the first block belonging to the third type or the fourth type is set as the above motion vector candidate. If any one of the blocks C, B and E does not belong to the third type or the fourth type, the above motion vector is set as unavailable. The first block is a block encountered first when the blocks C, B and E are retrieved in this order.

If the left motion vector candidate belongs to the third type or the fourth type, the above motion vector candidate is set as unavailable.

The temporal motion vector candidate is derived (S230). The temporal motion vector candidate is derived as follows. If the left motion vector candidate and the above motion vector candidate are available and different each other, the temporal motion vector candidate may not be derived.

First, a temporal motion vector candidate picture is determined. The temporal motion vector candidate picture includes a temporal motion vector candidate block. One temporal motion vector candidate picture is used within a slice. A reference picture index of the temporal motion vector candidate picture may be set to zero.

If the current slice is a P slice, one of the reference pictures of the reference picture list 0 is set to the temporal motion vector candidate picture. If the current slice is a B slice, one of the reference pictures of the reference picture lists 0 and 1 is set to the temporal motion vector candidate picture. A list indicator specifying whether the temporal motion vector candidate picture belongs to the reference picture lists 0 or 1 is included in a slice header if the current slice is a B slice. The reference picture index specifying the temporal motion vector candidate picture may be included in the slice header.

Figure 5:
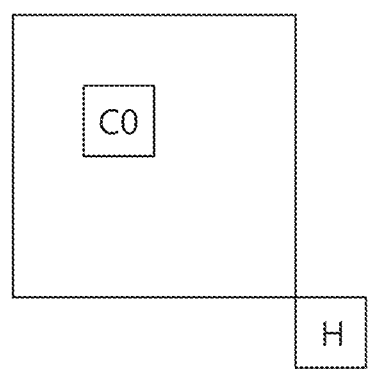
FIG. 5 is a conceptual diagram illustrating position of temporal motion vector candidate block according to the present invention.

Next, the temporal motion vector candidate block is determined. FIG. 5 is a conceptual diagram illustrating position of temporal motion vector candidate block according to the present invention. As shown in FIG. 5, a first candidate block may be a right-below corner block (block H) of the block C. The block C has same size and same location of the current block and is located within the temporal motion vector candidate picture. A second motion vector candidate block is a block covering an upper-left pixel of the center of the block C.

The temporal motion vector candidate block may be the first candidate block or the second candidate block. If the first candidate block is available, the first candidate block is set to the temporal motion vector candidate block. If the first candidate block is unavailable, the second candidate block is set to the temporal motion vector candidate block. If the second candidate block is unavailable, the temporal motion vector candidate block is set as unavailable.

The temporal motion vector candidate block is determined based on the position of the current block. For example, if the current block is adjacent to a lower LCU (that is, if the first candidate block belongs to a lower LCU), the first candidate block may be changed into a block within a current LCU or is set as unavailable.

Also, the first and second candidate blocks may be changed into another block based on each position of the candidate block within a motion vector storing unit. The motion vector storing unit is a basic unit storing motion information of reference pictures.

Figure 6:
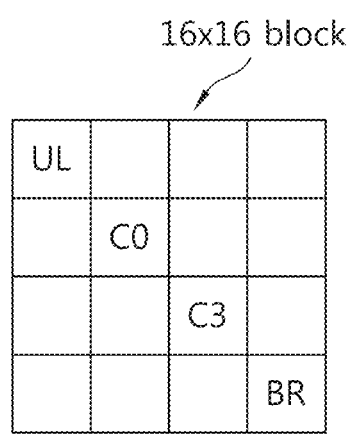
FIG. 6 is a conceptual diagram illustrating a method of storing motion information according to the present invention.

FIG. 6 is a conceptual diagram illustrating a method of storing motion information according to the present invention. As shown in FIG. 6, the motion storing unit may be a 16×16 block. The motion vector storing unit may be divided into sixteen 4×4 bocks. If the motion vector storing unit is a 16×16 block, the motion information is stored per the motion vector storing unit. If the motion vector storing unit includes multiple prediction units of reference picture, motion information of a predetermined prediction unit of the multiple prediction units is stored in memory to reduce amount of motion information to be stored in memory. The predetermined prediction unit may be a block covering one of the sixteen 4×4 blocks. The predetermined prediction unit may be a block covering a block C3, a block BR. Or the predetermined prediction unit may be a block covering a block UL.

Therefore, if the candidate block does not include the predetermined block, the candidate block is changed into a block including the predetermined block.

If the temporal motion vector candidate block is determined, the motion vector of the temporal motion vector candidate block is set to the temporal motion vector candidate.

A motion vector candidate list is constructed (S240). The motion vector candidates are listed in the order of the left motion vector candidate, the above motion vector candidate and the temporal motion vector candidate. If the left motion vector candidate and the above motion vector candidate are same, the above motion vector candidate is removed from the motion vector candidate list.

If the number of the motion vector candidates is smaller than a predetermined number, one or more zero motion vectors are added to the motion vector list (S250). The predetermined number may be 2.

A motion vector candidate is selected as a motion vector predictor and the differential motion vector is generated by subtracting the motion vector candidate from the motion vector of the current block (S260).

The reference picture index, the differential motion vector and an AMVP index are encoded (S270). The AMVP index specifies the motion vector predictor.

Figure 7:
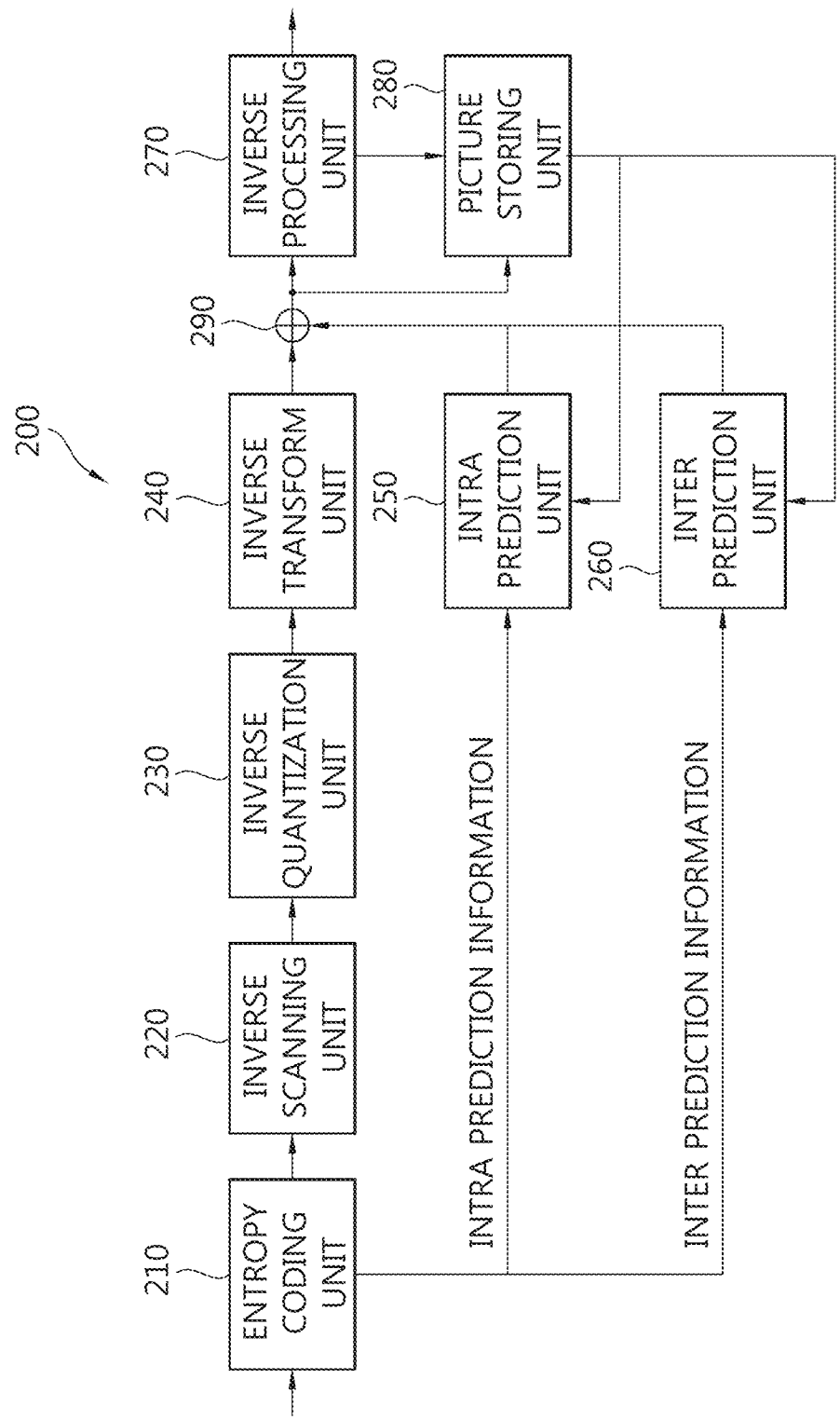
FIG. 7 is a block diagram of an image decoding apparatus according to the present invention.

FIG. 7 is a block diagram of an image decoding apparatus 200 according to the present invention.

The image decoding apparatus 200 according to the present invention includes an entropy decoding unit 210, an inverse scanning unit 220, an inverse quantization unit 230, an inverse transform unit 240, an intra prediction unit 250, an inter prediction unit 260, a post-processing unit 270, a picture storing unit 280 and an adder 290.

The entropy decoding unit 210 extracts the intra prediction information, the inter prediction information and the quantized coefficient components from a received bit stream using a context-adaptive binary arithmetic decoding method.

The inverse scanning unit 220 applies an inverse scan pattern to the quantized coefficient components to generate a quantized block. In inter prediction, the inverse scan pattern is a diagonal scan. The quantized coefficient components include the significant flags, the coefficient signs and the coefficients levels.

When the size of the transform unit is larger than a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

An indicator of the last non-zero coefficient position and the non-zero subset flags are extracted from the bit stream. The subset flag is defined for each subset other than the first subset and the last subset. The subset flag indicates whether the subset contains non-zero coefficient.

The inverse scanning unit 220 determines the number of subsets from the last subset to the first subset to be generated using the location of the last non-zero coefficient of the transform unit. Then, the inverse scanning unit 220 generates each subset from the last subset to the first subset. If the subset flag indicates that the subset contains non-zero coefficient, the subset is generated by inversely scanning the significant coefficients, coefficient signs and coefficient levels. If the subset flag indicates that the subset does not contain non-zero coefficient, all of the coefficient of the subset are set to 0. The last subset and the first subset are generated by inversely scanning the significant coefficients, coefficient signs and coefficient levels.

The inverse quantization unit 230 receives the differential quantization parameter from the entropy decoding unit 210 and generates the quantization parameter predictor to generate the quantization parameter of the coding unit. The operation of generating the quantization parameter is the same as the operation of the quantization unit 150 of FIG. 1. Then, the quantization parameter of the current coding unit is generated by adding the differential quantization parameter and the quantization parameter predictor. If the differential quantization parameter for the current coding unit is not received from the encoder, the differential quantization parameter is set to 0.

A parameter for indicating the relationship between the quantization parameter and the chroma quantization parameter is included in the PPS. Another parameter is included in the slice header if it is allowed to change the relationship by the slice. Therefore, the chroma quantization parameter is generated using the quantization parameter and the parameter included in the PPS or using the quantization parameter and the two parameters.

The inverse quantization unit 230 inversely quantizes the quantized block.

The inverse transform unit 240 inversely transforms the inverse-quantized block to restore a residual block. The inverse transform type is adaptively determined according to the prediction mode and the size of the transform unit. The inverse transform type is the DCT-based integer transform or the DST-based integer transform. In inter prediction, DCT-based integer transforms are used.

The intra prediction unit 250 restores the intra prediction mode of the current prediction unit using the received intra prediction information, and generates a prediction block according to the restored intra prediction mode.

The inter prediction unit 260 restores the motion information of the current prediction unit using the received inter prediction information, and generates a prediction block using the motion information.

The post-processing unit 270 operates the same as the post-processing unit 180 of FIG. 1.

The picture storing unit 280 receives post-processed image from the post-processing unit 270, and stores the image in picture units. A picture may be a frame or a field.

The adder 290 adds the restored residual block and a prediction block to generate a reconstructed block.

Figure 8:
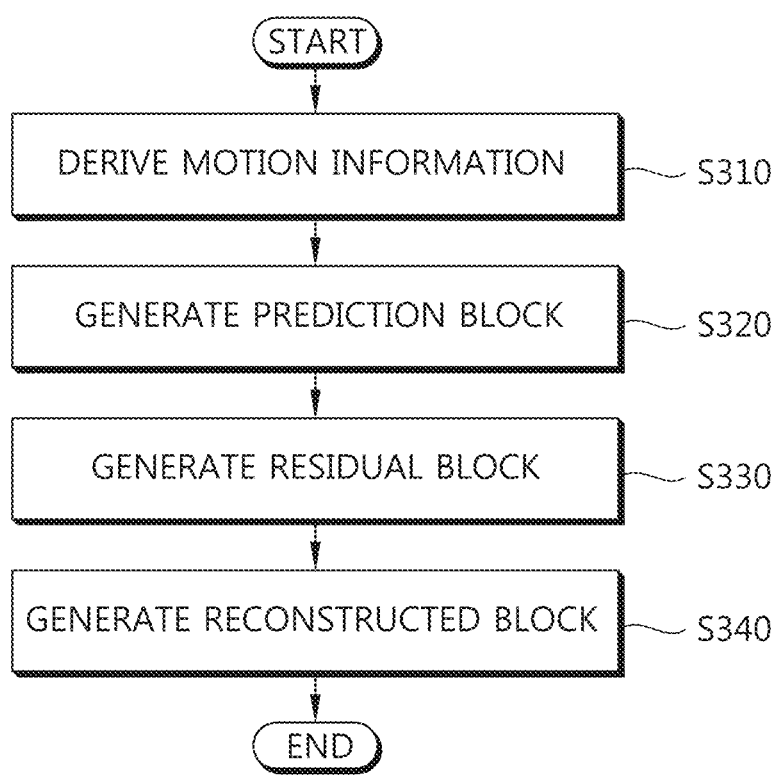
FIG. 8 is a flow chart illustrating a method of decoding an image in inter prediction mode according to the present invention.

FIG. 8 is a flow chart illustrating a method of decoding an image in inter prediction mode according to the present invention.

Motion information of a current block is derived (S310). The current block is a prediction unit. A size of the current block is determined by a size of a coding unit and a partitioning mode.

The motion information varies according to a prediction type. If the prediction type is a uni-directional prediction, the motion information includes a reference index specifying a picture of a reference list 0, and a motion vector. If the prediction type is a bi-directional prediction, the motion information includes a reference index specifying a picture of a reference list 0, a reference index specifying a picture of a reference list 1, and a list 0 motion vector and a list 1 motion vector.

The motion information is adaptively decoded according the coding mode of the motion information. The coding mode of the motion information is determined by a skip flag and a merge flag. If the skip flag is equal to 1, the merge flag does not exist and the coding mode is a skip mode. If the skip flag is equal to 0 and the merge flag is equal to 1, the coding mode is a merge mode. If the skip flag and the merge flag are equal to 0, the coding mode is an AMVP mode.

A prediction block of the current block is generated using the motion information (S320).

If the motion vector indicates a pixel position, the prediction block is generated by copying a block of the reference picture specified by the motion vector. If the motion vector indicates a sub-pixel position, the prediction block is generated by interpolating the pixels of the reference picture.

A residual block is generated (S330). The residual block is generated by the entropy decoding unit 210, the inverse scanning unit 220, the inverse quantization unit 230 and the inverse transform unit 240 of FIG. 7.

A reconstructed block is generated using the prediction block and the residual block (S340).

The prediction block has the size of the prediction unit, and the residual block has the size of the transform unit. Therefore, the residual signals and the prediction signals of same size are added to generate reconstructed signals.

Figure 9:
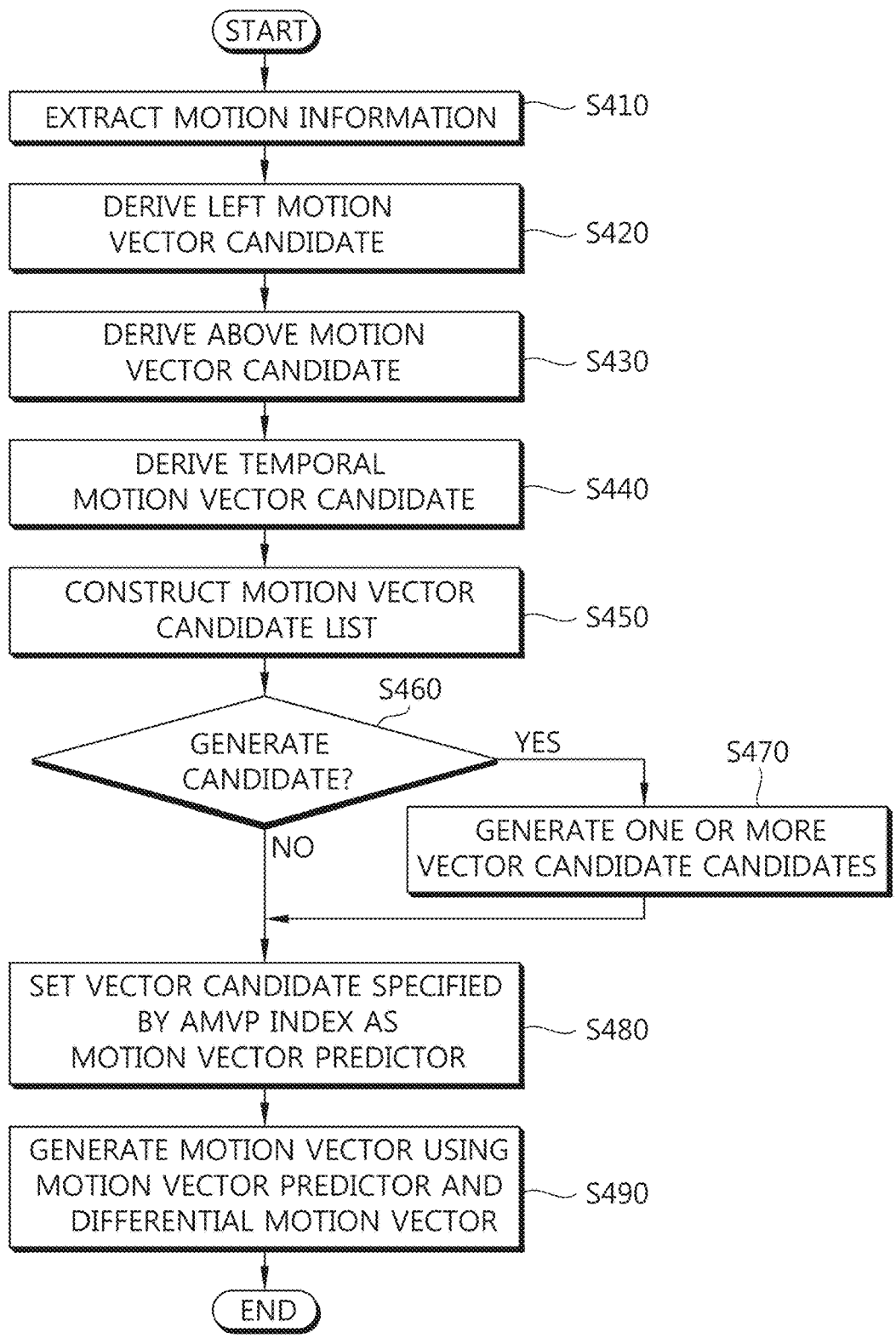
FIG. 9 is a flow chart illustrating a method of deriving motion information in an AMVP mode according to the present invention.

FIG. 9 is a flow chart illustrating a method of deriving motion information in the AMVP mode according to the present invention.

A reference picture index, a differential motion vector and an AMVP index is extracted from a bit stream (S410). The AMVP index specifies a motion vector predictor.

A left motion vector candidate is derived (S420). The left motion vector candidate is derived as described in S210 of FIG. 3.

An above motion vector candidate is derived (S430). The above motion vector candidate is derived as described in S220 of FIG. 3.

A temporal motion vector candidate is derived (S440). The temporal motion vector candidate is derived as describe in S230 of FIG. 3. If the left motion vector candidate and the above motion vector candidate are available and different each other, the temporal motion vector may not be derived.

A motion vector candidate list is constructed (S450). The motion vector candidates are listed in the order of the left motion vector candidate, the above motion vector candidate and the temporal motion vector candidate. If the left motion vector candidate and the above motion vector candidate are same, the above motion vector candidate is removed from the motion vector candidate list.

If the number of the motion vector candidates is smaller than 2, one or two zero motion vectors are added to the motion vector list (S460).

A motion vector candidate specified by the AMVP index is set as the motion vector predictor (S470).

The motion vector of the current block is generated by adding the differential motion vector and the motion vector predictor (S480).

Figure 10:
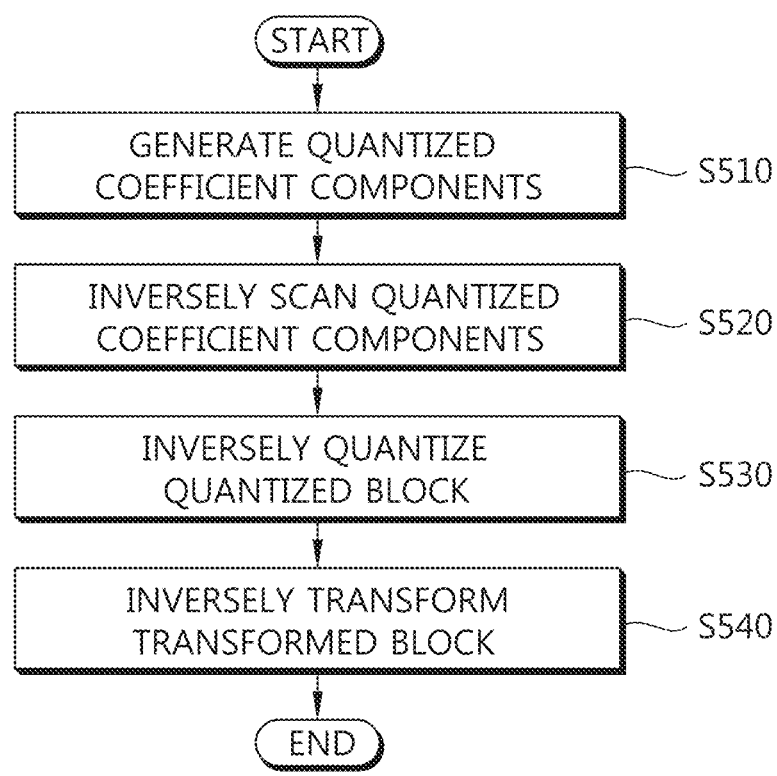
FIG. 10 is a flow chart illustrating a method of generating a residual block in inter prediction mode according to the present invention.

FIG. 10 is a flow chart illustrating a method of generating a residual block in inter prediction mode according to the present invention.

Quantized coefficient components are generated by the entropy decoding unit (S510).

A quantized block is generated by inversely scanning the quantized coefficient components according to the diagonal scan (S520). The quantized coefficient components include the significant flags, the coefficient signs and the coefficients levels.

When the size of the transform unit is larger than a predetermined size, the significant flags, the coefficient signs and the coefficients levels are inversely scanned in the unit of subset using the diagonal scan to generate subsets, and the subsets are inversely scanned using the diagonal scan to generate the quantized block. The predetermined size is equal to the size of the subset. The subset is a 4×4 block including 16 transform coefficients. The significant flags, the coefficient signs and the coefficient levels are inversely scanned in the reverse direction. The subsets are also inversely scanned in the reverse direction.

The last non-zero coefficient position and the non-zero subset flags are extracted from the bit stream. The number of encoded subsets is determined according to the last non-zero coefficient position. The non-zero subset flags are used to determine whether the subset has at least one non-zero coefficient. If the non-zero subset flag is equal to 0, the subset is generated using the diagonal scan. The first subset and the last subset are generated using the inverse scan pattern.

The quantized block is inversely quantized using an inverse quantization matrix and a quantization parameter (S530).

The quantization parameter is derived as follows.

A minimum size of the quantization unit is determined. A parameter cu_qp_delta_enabled_info is extracted from a picture parameter set of a bit stream, and the minimum size of the quantization unit is determined using the parameter.

A differential quantization parameter of the current coding unit is derived. The coded differential quantization parameter is arithmetically decoded to generate bin string indicating the absolute value of the differential quantization parameter and a bin indicating the sign of the differential quantization parameter. The bin string may be a truncated unary code. If the absolute value of the differential quantization parameter is zero, the bin indicating the sign does not exist. The differential quantization parameter is derived using the bin string indicating the absolute value and the bin indicating the sign.

A quantization parameter predictor of the current coding unit is derived. The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor.

If multiple coding units belong to a quantization unit of minimum size, the quantization parameter predictor for the first coding unit in decoding order is derived and used for the other coding units.

The quantization parameter of the current coding unit is generated using the differential quantization parameter and the quantization parameter predictor.

A residual block is generated by inverse-transforming the inverse-quantized block (S540). One dimensional horizontal and vertical inverse DCT based-transforms are used.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of decoding an image, comprising:
constructing an advanced motion vector prediction (amvp) candidate list using available motion vector candidates of a left motion vector candidate, an above motion vector candidate and a temporal motion vector candidate;
selecting a motion vector predictor among motion vector candidates of the amvp candidates list using the amvp index, and generating a motion vector using the motion vector predictor and a differential motion vector;
generating a prediction block using the motion vector and a reference picture index;
inversely quantizing a quantized block using a quantization parameter to generate a transformed block and inversely transforming the transformed block to generate a residual block; and
generating a reconstructed block using the prediction block and the residual block, wherein the quantization parameter is generated per quantization unit, and a minimum size of the quantization unit is adjusted per picture,
wherein the quantization parameter is generated using a differential quantization parameter and a quantization parameter predictor, and the quantization parameter predictor is generated using an average of first two available quantization parameters of a left quantization parameter, an above quantization parameter and a previous quantization parameter according to an order of the left quantization parameter, the above quantization parameter and the previous quantization parameter,
wherein the previous quantization parameter is set as the quantization parameter predictor when the left and above quantization parameters are unavailable, and
wherein the differential quantization parameter is generated by restoring a bin string indicating an absolute value of the differential quantization parameter and a bin indicating a sign of the differential quantization parameter.

2. The method of claim 1, wherein the temporal motion vector candidate is a motion vector of a temporal motion vector candidate block within a temporal motion vector candidate picture, and the temporal motion vector candidate block is determined depending on a position of a current block.

3. The method of claim 1, wherein the left motion vector candidate is a motion vector of a left block or a bottom-left block and the above motion vector candidate is a motion vector of an above block, an above-right block or an above-left block.

4. The method of claim 3, wherein when any one of the above-right block, the above block, and the above-left block belongs to the first type or the second type, the motion vector of the first block encountered in an order of the above-right block, the above block, and the above-left block is set as the above motion vector candidate.

5. The method of claim 4, wherein when a reference picture of the left motion vector candidate is different from the reference picture of the current prediction unit, the above motion vector candidate is set as unavailable.

6. The method of claim 1, wherein when a size of the quantized block is larger than a predetermined size, a plurality of subsets are generated by inversely scanning quantized coefficient components and the quantized block is generated by inversely scanning the plurality of subsets in a reverse direction according to a diagonal scan.

* * * * *